United States Patent [19]

Scarano et al.

[11] Patent Number: 4,795,131
[45] Date of Patent: Jan. 3, 1989

[54] VACUUM CONTROLLER

[75] Inventors: Robert V. Scarano, Glens Falls; Joseph A. Bolton, Queensbury, both of N.Y.

[73] Assignee: Albany International Corp., Menands, N.Y.

[21] Appl. No.: 922,521

[22] Filed: Oct. 24, 1986

[51] Int. Cl.⁴ ............................................. F16K 31/122
[52] U.S. Cl. .................................. 251/63; 137/625.3; 137/625.37; 137/907; 251/63.5; 251/282
[58] Field of Search ............ 137/494, 505.18, 596.18, 137/625.3, 625.33, 625.35, 625.36, 625.37, 625.66, 625.67, 625.68, 907, 116.3, 116.5; 251/62, 63, 63.5, 282

[56] References Cited

U.S. PATENT DOCUMENTS

| | | | |
|---|---|---|---|
| 1,873,138 | 8/1932 | Mitchell | 251/61.1 |
| 2,459,527 | 1/1949 | Herbert | 251/61.1 |
| 2,861,587 | 11/1958 | Hursen | 137/494 |
| 3,063,461 | 11/1962 | Rudolph | 137/102 |
| 3,256,903 | 6/1966 | Svensson | 137/116.3 |
| 3,332,440 | 7/1967 | Brakebill | 137/595 |
| 3,426,998 | 2/1969 | Kintner | 251/324 |
| 3,463,188 | 8/1969 | Ryan et al. | 137/599 |
| 3,468,341 | 9/1969 | Newcomb et al. | 137/116.3 |
| 3,508,577 | 4/1970 | Vincent et al. | 257/62 |
| 3,590,848 | 7/1971 | Svensson | 137/116.3 |
| 3,766,933 | 10/1973 | Nicholson, Jr. | 137/116.3 |
| 3,809,127 | 5/1974 | Gilbert | 251/63 |
| 3,822,819 | 7/1974 | Wilson et al. | 251/61.1 |
| 4,092,998 | 6/1978 | Taplin | 137/471 |
| 4,138,089 | 2/1979 | McCarthy | 251/61 |
| 4,310,140 | 1/1982 | Boomer et al. | 251/5 |
| 4,367,861 | 1/1983 | Bray et al. | 251/61 |
| 4,376,444 | 3/1983 | Michael | 137/1 |
| 4,390,036 | 6/1983 | Athanassiu et al. | 137/116.5 |
| 4,413,644 | 11/1983 | Woodward | 137/103 |
| 4,445,539 | 5/1984 | Credle | 137/614.03 |
| 4,466,455 | 8/1984 | Athanassiu et al. | 137/116.5 |
| 4,525,183 | 6/1985 | Cordes et al. | 251/63 |

FOREIGN PATENT DOCUMENTS 1052765  3/1959  Fed. Rep. of Germany ........ 251/62

OTHER PUBLICATIONS

AES V-700 Vacuum Control Valves by Albany International Engineered Systems Division (pp. 1-4, undated).

Primary Examiner—George L. Walton
Attorney, Agent, or Firm—Kane, Dalsimer, Sullivan, Kurucz, Levy, Eisele and Richard

[57] ABSTRACT

A vacuum controller for controlling the vacuum at a controlled vacuum which includes a balanced piston arrangement coupled to a valve piston reciprocal with respet to a valve seat positioned between the controlled vacuum and a high header or source vacuum. A throttling of the header vacuum takes place across the space between the valve piston and valve seat and is such that the header vacuum does not influence the movement of the valve piston.

11 Claims, 4 Drawing Sheets

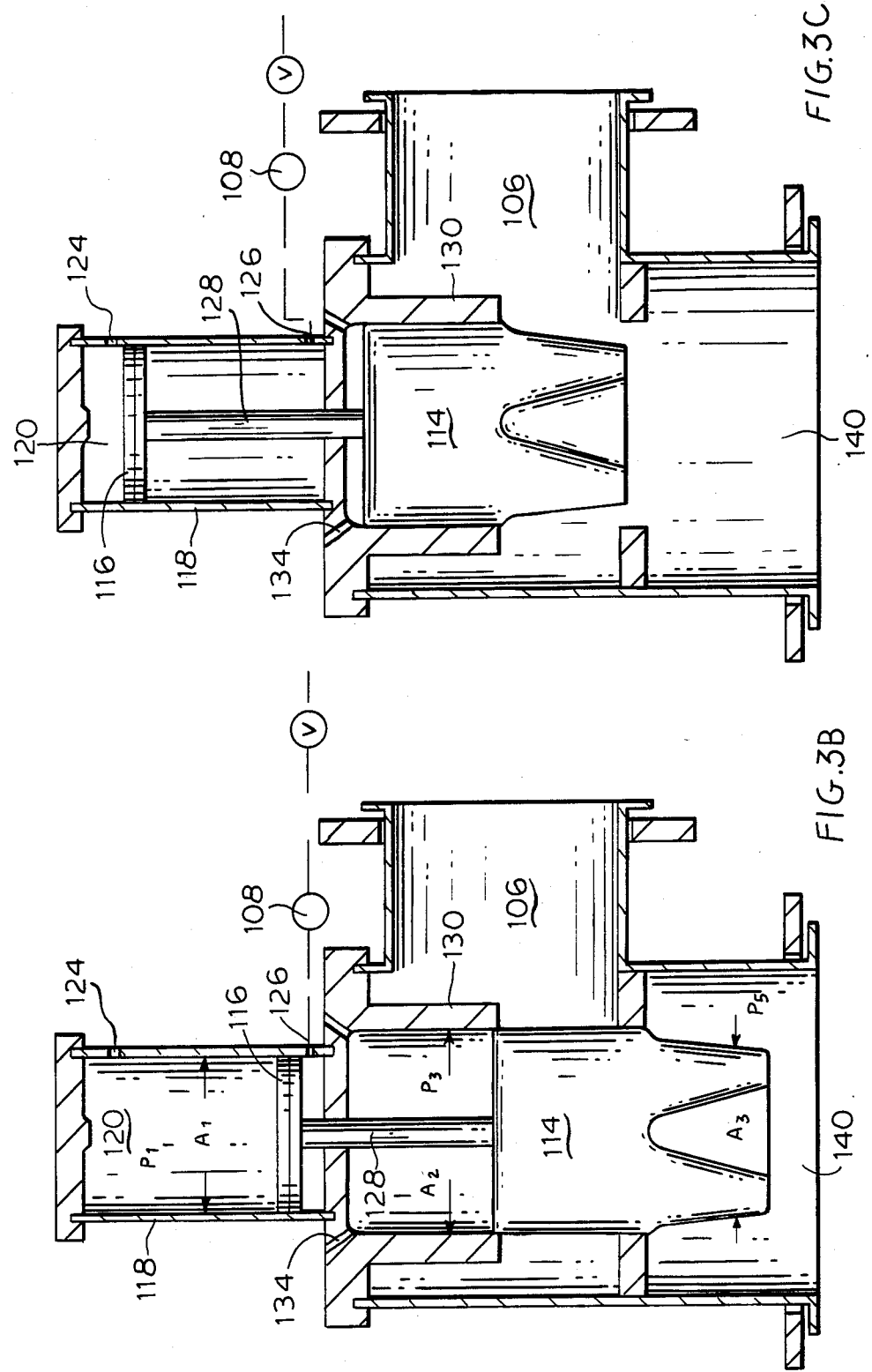

VACUUM CONTROLLER

FIELD OF THE INVENTION

The present invention relates to a vacuum controller, in particular, a vacuum controller which automatically controls the vacuum supplied.

BACKGROUND OF THE PRESENT INVENTION

There presently exists a wide variety of valves used to control the vacuum being supplied at a particular application. In particular, in the papermaking industry vacuum control valves are used extensively. In a typical situation such valves are used to regulate the suction to the suction boxes. See, for example, U.S. Pat. No. 3,766,933. An automatic valve of this nature which has been widely utilized is that sold by Albany International, assignee herein, under Model No. AES V-700. The V-700 valve, which is basically shown in FIG. 1, utilizes two back-to-back piston assemblies with different size pistons and rolling diaphragms. The movement of the pistons causes a small diaphragm to cover or uncover holes in a cylinder allowing air to flow therethrough or to stop such flow depending upon the desired vacuum. While such a vacuum controller has proven eminently satisfactory and has received wide commercial acceptance, there is a desire to improve it further.

Other valves are shown in U.S. Pat. Nos. 4,413,644; 4,390,036 and 4,466,455. U.S. Pat. No. 4,413,644 shows a bleeder valve comprising a plurality of valve members in tandem to control the vacuum in suction boxes and the like.

U.S. Pat. No. 4,390,036 provides for a vacuum controller which utilizes several plungers, one of which has several openings in its inside wall which utilizes a rolling diaphragm to close off or open access to the vacuum source and/or the atmosphere for throttling purposes, etc.

U.S. Pat. No. 4,466,455 relates to a vacuum controller which uses a reciprocal plunger and flexible diaphragm which operates as a valving mechanism. As the plunger moves one way, the diaphragm closes off the opening in the side wall of the plunger and in the opposite direction it opens the opening.

In situations where diaphragms are used to cover and uncover holes in a throttling mechanism, heavy diaphragms or Bellowframs TM are utilized. The heavier diaphragm results in less flexibility and response with consequential higher hysteresis. Furthermore, in certain applications, particularly in papermaking, there is a possibility contamination of the necessarily small holes used for throttling. It would therefore be desirable to provide for a vacuum controller that is flexible, responsive and avoids the use of small openings which have the chance of contaminants lodging therein.

SUMMARY OF THE INVENTION

It is therefor a principal object of the invention to provide for a vacuum controller which avoids the use of heavy diaphragms and throttling openings which are small in size.

It is a further object to provide for such a controller which is flexible and provides reduced hysteresis and faster response.

It is another object to provide for a controller which is automatic and, in addition, adaptable for use in varying applications, one which may include a feedback means to allow for self adjusting of the valve.

The present invention provides for a vacuum controller which utilizes a balance piston design for controlling a regulated vacuum chamber such as that coupled to the flat box section of a papermaking machine. A cavity exists between a large upper piston and diaphragm on a small lower piston. The diaphragm is pressurized with compressed air which will tend to lift the assembly due to the difference in the piston areas. The bottom of the lower piston is exposed to the regulated or controlled vacuum provided, for example, to the flat boxes which pulls the assembly downward. The compressed air signal is adjusted to generate a force equal to the force generated by the effect of the controlled vacuum on the bottom of the lower piston. The entire piston assembly is free to move vertically to a location where the forces involved are balanced.

Throttling is accomplished through the use of a vertical window of a constant diameter and varying height. The bottom piston is exposed to only controlled vacuum and not the average of the header or source vacuum and controller vacuum. The use of a larger (variable) throttling passage, avoids the clogging of throttling holes. Also, the use of a lighter diaphragm is possible which allows for flexibility and quicker response time.

In addition, the shape of the piston may be varied as long as the control area, that area upon which the controlled or regulated vacuum acts, is maintained by the geometry of the valve so that the header or source vacuum does not migrate under the piston and thereby influence the control of the piston.

Furthermore, the balancing piston may include a plurality of pistons operating in tandem for the particular balancing needs and may also include a feedback means to allow for self-adjusting of the valve.

BRIEF DESCRIPTION OF THE DRAWINGS

Thus by the present invention, its objects, advantages and others will be realized, the description of which should be taken in conjunction with the drawings, wherein:

FIG. 3B is a view similar to FIG. 3A with, however, the plunger shown in a fully closed position;

FIG. 3C is a view similar to FIGS. 3A and 3B with, however, the plunger shown in a fully open position.

DETAILED DESCRIPTION OF THE PREFERRED EMBODIMENTS

Figure 2:
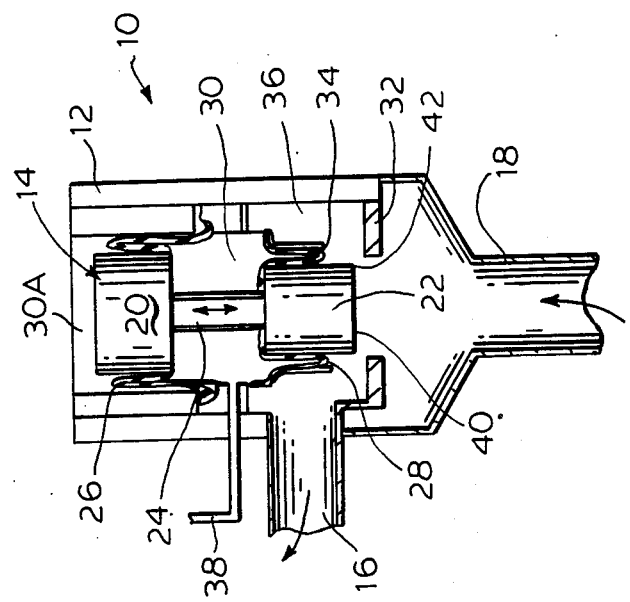
FIG. 2 is a sectional view of a vacuum controller incorporating the teachings of the present invention.
Figure 1:
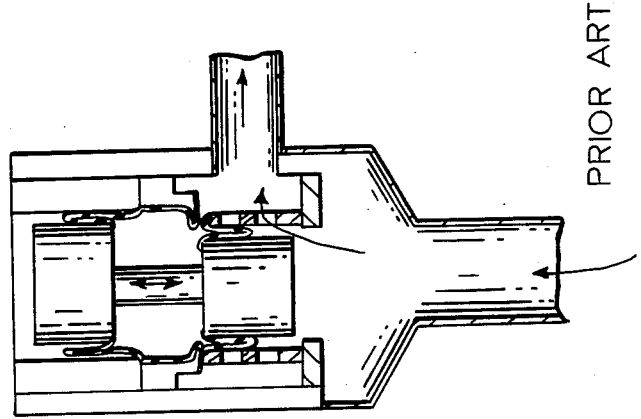
FIG. 1 is a sectional view of a vacuum controller in the prior art.

Turning now more particularly to FIG. 2, there is shown a vacuum control valve or controller 10 which includes a cylindrical outer casing 12 in which a valve member 14 reciprocates. The controller 10 is coupled to a source header vacuum through conduit 16 and, for example, a separator and regulated or controlled vacuum at, i.e., flat boxes through conduit 18.

The valve member 14 includes two pistons the first piston 20 of which is larger then the second piston 22 coupled by a shaft member 24 such that the pistons 20 and 22 move in tandem. Each piston 20 and 22 is provided with rolling diaphragms (upper) 26 and 28 (lower), respectively, which define chambers 30 and 30A. The lower diaphragm 26 rides between the piston 22 and a downwardly extending continuous sleeve 34.

Piston 22 is positioned above a circular valve seat or ring 32 which, with the piston 22, serves to define a chamber 36 in which conduit 16 communicates.

Chamber 30A may be at atmospheric with chamber 30 communicating with a source of control pressure via inlet 38. An increased pressure in chamber 30 will tend to lift the valve assembly 14. The bottom 40 of the lower piston 22 is exposed to the controlled or regulated vacuum which tends to pull the assembly downward. The control air signal at 38 can be adjusted to generate a force equal to the force generated by the effect of the desired control vacuum on the bottom 40 of the lower piston 22. The entire piston assembly is free to move vertically to a location where the forces involved are in balance.

Throttling is accomplished through the use of a vertical window of constant diameter and varying height. This would be the smallest distance between the valve seat or ring 32 and the bottom 40 of the piston 22. The piston 22 should not be allowed to travel to such a great extent that the throttling point extends beyond the bottom 40 of piston 22 which would allow the higher header vacuum to migrate under the bottom 40. If that were to occur, this would lead to the undesired result that the header vacuum would influence the control of the piston assembly 14.

In this regard, while a cylindrical flat bottom piston 22 is shown wherein the throttling takes place between the valve seat 32 and the edge 42 of piston 22, other shapes and sizes of pistons may be utilized as long as throttling zone is controlled such that the header vacuum does not migrate to influence movement of the piston assembly 14. Arrangements such as tapered pistons and tapered valve seats may also be used if suitable for purpose.

Figure 3A:
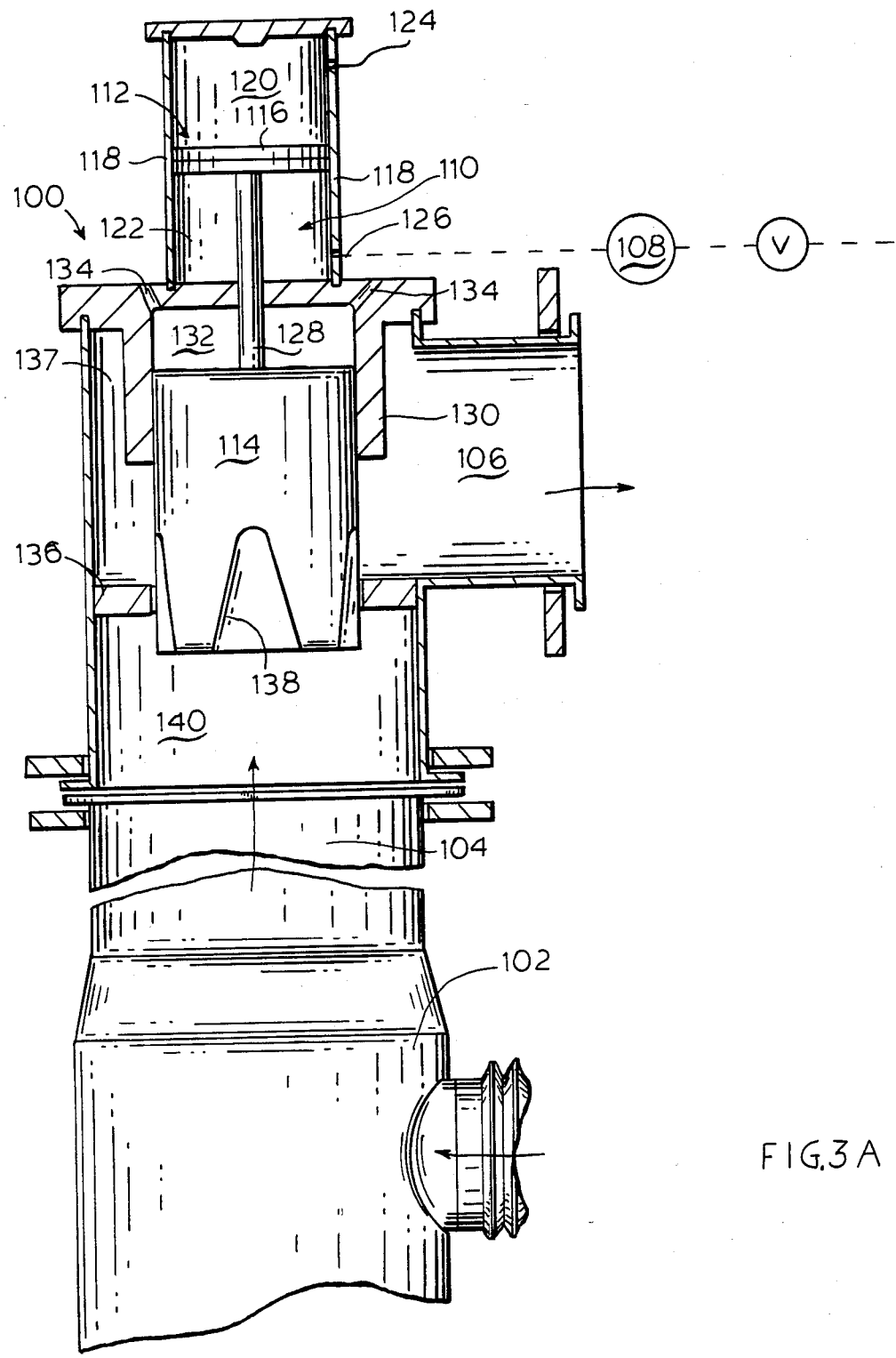
FIG. 3A is an enlarged partially sectional view of a modified version of a vacuum controller with its plunger in a mid-way position, incorporating the teachings of the present invention.

With reference now more particularly to FIGS. 3A-3C, there is shown a somewhat enlarged vacuum controller valve 100 coupled to a separator 102 via a stand pipe 104. The stand pipe 104 is typically coupled to a flat box used in papermaker applications and a source of controlled or regulated vacuum. The vacuum controller 100 is also coupled via a conduit 106 to a source of vacuum or vacuum header. In addition, an air regulator 108 is utilized such as that provided by Albany International, assignee hereof in its AES-700 Control System Regulator, whose function will be discussed.

The vacuum controller 100 comprises a balance piston assembly 110 which utilizes air pressure from a regulator 108 to feed a low friction air cylinder 112 which serves to counteract or adjust for the force acting against the valve plug or piston 114, by the controlled vacuum as will also be discussed. The air cylinder 112 comprises an air piston 116 which slideably reciprocates in a cylinder 118 defining two chambers, one upper 120 and low 122. Chamber 120 is at atmospheric pressure via port 124 with chamber 122 coupled to the regulator 108 via port 126 so that the desired variation of pressure in chamber 122 as regulated by regulator 108 will result in a force exerted on the piston 116 and allow for a variation of vacuum as desired. Piston 116 is coupled to piston 114 by way of a rod 128. Piston 114 is subject to vertical movement within a cylindrical valve wall 130 at its upper end defining a chamber 132 which is vented to the atmosphere via ports 134.

At the lower end a valve ring or seat 136 is provided in which piston 114 reciprocates. Chamber 137 which is intermediate the valve wall 130 and valve ring 136 communicates with conduit 106. The position of the piston 114 with respect to the valve ring determines the flow from the suction or flat box up the separator 104 through the valve ring 136 and out the side of the controller 100 to the vacuum header via conduit 106. In FIG. 3A the position of the piston 114 is shown in its mid-way or half open position. The bottom of the piston 114 is provided with V-shaped notches 138 about its circumference through which the flow passes. As noted earlier, other shaped pistons suitable for purpose, may also be utilized.

FIG. 3B shows the piston 114 in the fully closed position so that no flow passes with FIG. 3C showing it in a fully open position where maximum air flow exists.

The basic operation of the controller 100 is as follows. The regulator 108 is used in association with the air cylinder 112 to counteract the force acting against the piston 114 or otherwise adjust its position to vary the vacuum being supplied. The downward force acting against the piston 114 is due to the pressure differential across it with atmospheric pressure on top in chamber 120 and the controlled or regulated vacuum on the bottom in the conduit 140 coupled to the stand pipe 104.

To raise the vacuum level at the stand pipe 104 and in turn the level at the flat or suction box, the air pressure to chamber 122 is increased which increases the upward force acting on the piston 116 and in turn piston 114. With this high force, the piston 114 moves upward increasing the exposed open areas of the V-notches, reducing the pressure differential across the piston 114 resulting in a higher vacuum at the stand pipe. Piston 114 moves upward until the downward forces acting on the valve plug or piston 114, due to the control vacuum, equal the upward force provided by the air cylinder 112.

The reverse is also true, to lower the vacuum at a given application, the air pressure supplied to chamber 122 is decreased.

With reference to FIG. 3B, the forces involved during the operation of the device will be explained. Note that the respective chambers have been marked with successively numbered P for pressure and A for areas.

Downward acting forces are as follows: Equation 1:

$$P_1 A_1 + P_3 A_2 + \text{Weight of (Piston assembly (piston 116 and rod 128)} + \text{Piston 114)}$$

Note: $P_1 = P_3 = A_S$

Upward Forces Equation 2:

$$P_2 A_1 + P_5 A_3 = P_2 A_1 + A_3(P_1 - P_{VAC})$$

Note: $P_5$ = Atmospheric Pressure − Vacuum Pressure

When the unit is in operation, the forces must be balanced.

Therefore, Equation 3:

$$P_1A_1 + P_1A_2 + Wts. = P_2A_1 + A_3(P_1 - P_{VAC})$$

According to Equation 3, the header vacuum $P_4$ plays no part in the operation of the controller. This is important because the controlled or regulated vacuum would vary if the header vacuum changed.

To calculate what air pressure is needed for a given controlled or regulated vacuum, assume the following:

$P_1$ = 14.7 psia or 15 psia
$P_2$ = Reg. Pressure $A_1 = \frac{\pi}{4}(6)^2 = 28.3$ in.$^2$ for a 6" diameter air cylinder.

$A_2 = \frac{\pi}{4}(8.5)^2 = 56.7$ in.$^2$ for an 8.5" diameter cylinder.

$A_3 = \frac{\pi}{4}(8.0)^2 = 50.2$ in.$^2$ for an 8.0" diameter cylinder.

Assume the weight (WTS) of piston assembly which includes the pistons 116 and connecting rod 128 (3 lbs.) and valve plug or piston 114 (5 lbs.) = 8 lbs.
The controlled vacuum = 5" Hg or 2.5 Δ psi.
Therefore, $$P_5 = P_1 - P_{VAC} = 15 - 2.5 = 12.5 \text{ psia}$$

To calculate the air pressure required from the regulator 108 to keep the valve in balance; from Equation 3, the system forces =

$$P_1 \text{ and } A_2 + P_1A_2 + WTS = P_2A_1 + A_3(P_1 31 P_{VAC})$$

OR $$15 \times 28.3 + 15 \times 56.7 + 8 = P_2 \times 28.3 + 50.2(15 - 2.5)$$

$$424.5 + 850 + 8 = 28.3P_2 + 627.5$$

$$P_2 = 23.1 \text{ psia or } 8.1 \text{ psig}$$

Assume the controlled vacuum varies from its 5" Hg setpoint by $-\frac{1}{2}$" Δ Hg or 0.25 Δpsi for example. The converting or unbalanced force on the valve can be determined as follows:

With all figures the same, with the exception of $P_5$, which now becomes 15 − 2.25 or 12.75 psia for a controlled vacuum of 4.5" Hg.

Returning to Equation 3, the unbalanced or correcting force can be calculated as follows:

$$P_1A_1 + P_2A_2 + WTS + F = P_2A_1 + A_3(P_1 - P_{VAC})$$

$$15 \times 28.3 + 15 \times 56.7 + 8 + F = 23.1 \times 28.3 + 50.2(15 - 2.25)$$

$$F = 1293.7 - 1282.5 = 11.2 \text{ lbs.}$$

The unbalanced or correcting force is acting upward with a force of 11.2 lbs. pushing the valve, plug or piston 114 up to allow for more open area, thereby trying to get the vacuum back to its controlled vacuum of 5" Hg.

Note: To calculate the correcting force, one must assume that there was an equal but opposite force F applied to keep the valve in balance.

Figure 4:
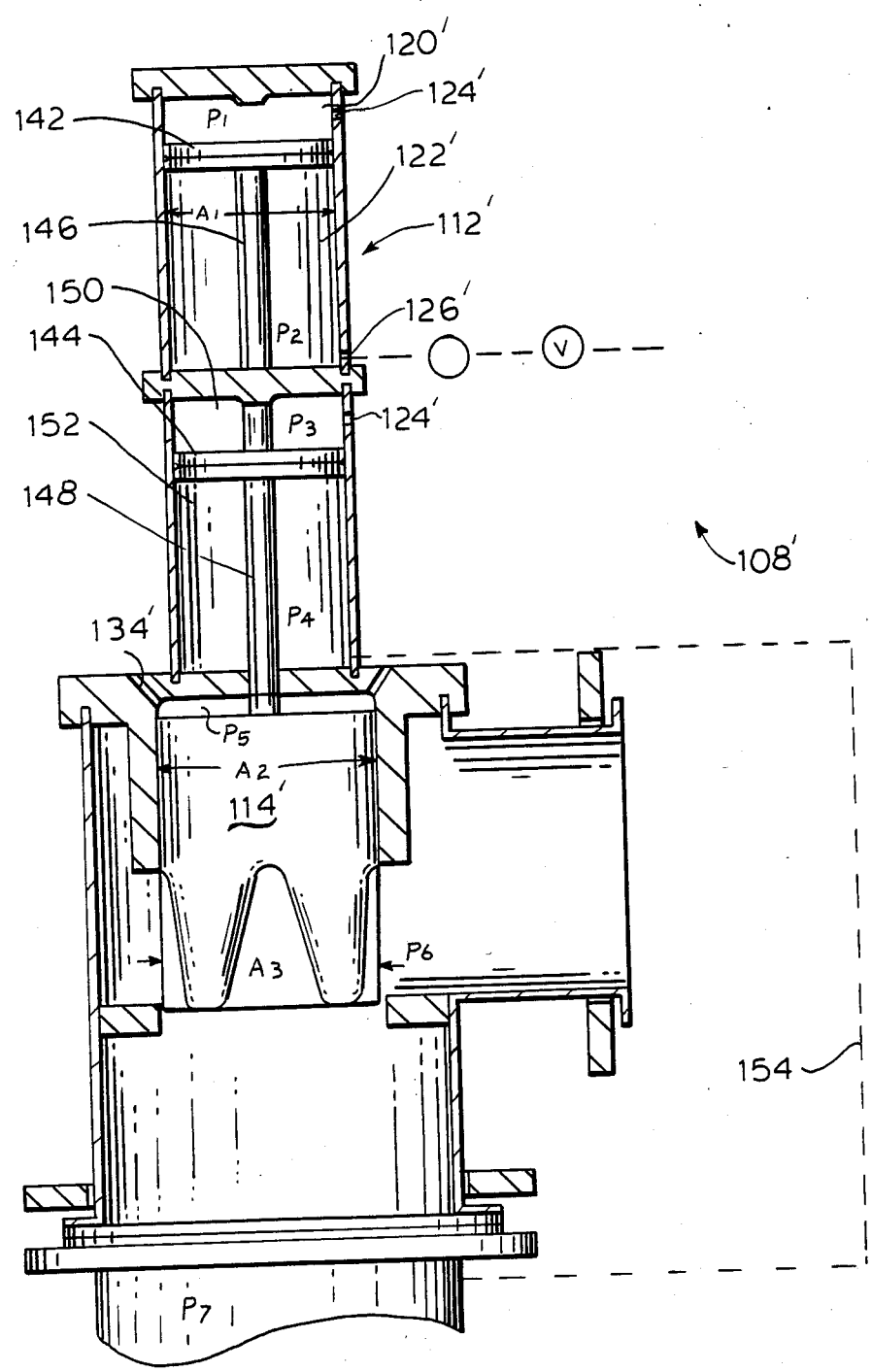
FIG. 4 is an enlarged view of a vacuum controller similar to FIGS. 3A-3C, however, having two balancing pistons, incorporating the teachings of the present invention.

Turning now to FIG. 4, there is shown a tandem arrangement for the low friction air cylinder with like parts similarly numbered but designated with a prime'. The air cylinder 112' now comprises a double piston arrangement 142 and 144 with respective piston rods 146 and 148 all of which couple to piston 114'. Four chambers 120', 150, 122' and 152 are now formed in the air cylinder 112' with the former two and latter two operating in tandem on their respective pistons.

A calculation of the advantages of a tandem arrangement are as follows:
Downward Forces
Equation 4:

$$P_1A_1 + P_3A_1 + P_5A_2 + \text{Wt. of (Piston Assembly + Valve Plug)}$$

Upward Forces
Equation 5:

$$P_2A_1 + P_4A_1 + P_7A_3 = P_2A_1 + (P_1 - P_{VAC})(A_3 = A_1)$$

Note: $P_1 = P_3 = P_5$ = Atmospheric Pressure

Also: $P_4 = P_7 = P_1 - P_{VAC}$

Note, when the unit is operating, the forces must be in balance.
Equation 6:

$$P_1A_1 + P_3A_1 + P_5A_2 + WTS = P_2A_1 + (P_1 - P_{VAC})(A_3 + A_1)$$

Using the same example amounts as earlier, to determine the air pressure required from the regulator 108' to keep the valve in balance when the controlled vacuum = 5" Hg. is as follows:

The weight of the piston assembly (piston 142, 144, rods 146, 148) is now assumed to be 6 lbs. instead of 3 lbs. as with the single air cylinder and valve, plug or piston 114' still weighs 5 lbs.
Equation 6:

$$15 \times 28.3 + 15 \times 28.3 + 15 \times 56.7 + 6 + 5 = P_2 \times 28.3 + (15 - 2.5)(50.3 + 28.3)$$

$$1,710 - 982.5 = 28.3 \, P_2$$

$$P_2 = \frac{727.5}{28.3} = 25.7 \text{ psia} = 10.7 \text{ psig}$$

In this example the result is 10.7 psig versus 8.1 psig earlier. If it is assumed that the controlled vacuum varies from its 5" Hg setpoint by $-\frac{1}{2}$" Hg or 0.25 Δ psi or 4.5" Hg, the correcting force would be determined as follows. Using Equation 6 to calculate the unbalanced force.

$$P_7 = P_1 - P_{VAC} = 15 - \frac{4.5}{30} \times 15 = 12.75 \text{ psia}$$

Equation 6:

$$15 \times 28.3 + 15 \times 28.3 + 15 \times 56.7 + 11 + F = 25.7 \times 28.3 + 12.75(50.2 + 28.3)$$

$$1,699 + F = 1,728.2$$

Therefore, F = 29.2 lbs. pushing the plug up allowing more open area so the vacuum can rise towards its setpoint as compared with the single air cylinder where only a 11.2 lb. correcting force was found. Accordingly, depending upon the particular application, the double tandem arrangement would be more desirable.

Note that in the case of either the single or double piston air cylinder, it is desirable to utilize ones that are very low or "friction free" because the greater the amount of friction, the less control achieved. Note also that a bellow or bellows arrangement may also be utilized in place of the friction-free cylinders, in addition to any other arrangement suitable for purpose.

In addition, the vacuum controller 112 may include a feedback means 154 which couples chamber 152 to the stand pipe 104 or conduit 140. This provides a feedback or self-correcting feature between $P_4$ and $P_7$. If $P_7$ goes up, then $P_4$ would also go up thereby forcing the piston assembly up resulting in the lowering of the $P_7$ providing a self-correcting feature.

Thus, by the aforenoted invention, its objects and advantages are realized and although a preferred embodiment is disclosed or described in detail herein, its scope should not be limited thereby; rather, its scope should be determined by that of the appended claims.

What is claimed is:

1. A vacuum controller for controlling the amount of vacuum at a location, said controller comprising:
   a housing;
   means for connecting said housing to a source of vacuum;
   means for connecting said housing to a control vacuum;
   balance piston means disposed in said housing and reciprocal therein, said piston means including first piston means reciprocal in a chamber and responsive to a control pressure in said chamber regulating the movement of said balance piston means therein;
   value piston coupled to the balance piston means so as to provide a concentric unbiased loading of said valve piston wherein movement of said balance piston means causes a corresponding movement of the valve piston;
   valve seat means positioned between the source vacuum and the controlled vacuum;
   said valve seat means adapted to receive said valve piston which is reciprocal with respect thereto between a fully open position and a fully closed position so as to regulate the amount of vacuum provided by the source vacuum to the controlled vacuum; and
   wherein a throttling of the source vacuum with respect to the controlled vacuum occurs between said valve piston and said valve seat such that the source vacuum does not influence the movement of the valve piston between said positions for throttling purposes and the valve piston remains balanced throughout its movement.

2. The invention in accordance with claim 1 wherein said valve seat means comprises a ring member having an opening therein for receiving the valve piston, said valve piston includes a lower edge portion engageable with said opening and said throttling occurs across a vertical window of variable height formed between the lower edge portion and said ring member.

3. The invention in accordance with claim 1 wherein said valve seat means comprises a ring member having an opening therein for receiving the valve piston, said valve piston includes a lower portion engageable with said opening having a plurality of V-shaped notches therein, and said throttling occurs across a space formed between said lower portion of said piston and said ring member.

4. The invention in accordance with claim 2 wherein said balance piston means comprises a low friction air cylinder which includes at least one air piston coupled to the valve piston by way of a piston rod, and means for regulating the movement of the air piston by regulation of the pressure differential there across so as to cause the desired throttling by the valve piston.

5. The invention in accordance with claim 4 wherein said air cylinder includes at least two air pistons coupled in tandem.

6. The invention in accordance with claim 3 wherein said balance piston means comprises a low friction air cylinder which includes at least one air piston coupled to the valve piston by way of a piston rod, and means for regulating the movement of the air piston by regulation of the pressure differential there across so as to cause the desired throttling by the valve piston.

7. The invention in accordance with claim 6 wherein said air cylinder includes at least two air pistons coupled in tandem.

8. The invention in accordance with claim 1 which includes feedback means coupled between said piston balance means and said controlled vacuum for feeding back pressure changes in the controlled vacuum to regulate the operation of the balance means so as to provide a self-correcting thereof.

9. A vacuum controller for controlling the amount of vacuum at a location, said controller comprising:
   a housing;
   means for connecting said housing to a source of vacuum;
   means for connecting said housing to a control vacuum;
   balance piston means disposed in said housing and reciprocal therein;
   valve piston coupled to the balance piston means so as to provide a concentric unbiased loading of said valve piston wherein movement of said balance piston means causes a corresponding movement of the valve piston;
   said valve piston positioned between the source vacuum and the controlled vacuum with the throttling geometry provided by the valve piston is such that the source vacuum does not influence or migrate to act on an area of the valve piston on which the controlled vacuum acts; and
   wherein a throttling of the source vacuum with respect to the controlled vacuum occurs such that the source vacuum does not influence the movement of the valve piston for throttling purposes and the valve piston remains balanced throughout its movement.

10. The invention in accordance with claim 9 wherein said throttling occurs across a vertical window of variable height formed across a horizontal plane so as to avoid any vertical component of the source vacuum from acting on the valve piston.

11. The invention in accordance with claim 10 which includes a valve seat means comprising a ring member having an opening therein for receiving the valve piston, said valve piston includes a lower portion engageable with said opening, and said throttling occurs across a horizontal plane formed between said lower portion of said piston and said ring member.

* * * * *